(12) United States Patent
Bai et al.

(10) Patent No.: US 12,087,930 B2
(45) Date of Patent: Sep. 10, 2024

(54) BATTERY PACK

(71) Applicant: CONTEMPORARY AMPEREX TECHNOLOGY CO., LIMITED, Ningde (CN)

(72) Inventors: Xueyu Bai, Ningde (CN); Yanlong Gu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 655 days.

(21) Appl. No.: 17/345,842

(22) Filed: Jun. 11, 2021

(65) Prior Publication Data
US 2021/0305641 A1    Sep. 30, 2021

Related U.S. Application Data

(63) Continuation of application No. PCT/CN2019/079675, filed on Mar. 26, 2019.

(30) Foreign Application Priority Data

Dec. 29, 2018 (CN) .......................... 201822246578.1

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/647* (2015.04); *H01M 50/204* (2021.01); *H01M 50/209* (2021.01)

(58) Field of Classification Search
CPC ........... H01M 10/6556; H01M 10/613; H01M 50/204; H01M 50/209
See application file for complete search history.

(56) References Cited

U.S. PATENT DOCUMENTS

| 9,533,600 | B1 | 1/2017 | Schwab et al. | |
| 2019/0288254 | A1* | 9/2019 | Newman | H01M 50/262 |
| 2020/0091571 | A1* | 3/2020 | Burgers | H01M 50/289 |

FOREIGN PATENT DOCUMENTS

| CN | 101950822 A | 1/2011 |
| CN | 207116546 U | 3/2018 |

(Continued)

OTHER PUBLICATIONS

State Intellectual Property Office of China Notice of Grant of Invention Patent Right for Application No. 201822246578.1 Jun. 6, 2019 2 pages (including translation).

(Continued)

*Primary Examiner* — Jonathan G Jelsma
(74) *Attorney, Agent, or Firm* — ANOVA LAW GROUP, PLLC

(57) ABSTRACT

The battery pack according to this application includes: a frame body, enclosing an accommodating space that is closed circumferentially and opened in a height direction; and a heat exchange plate, fixed under the frame body and closing a lower opening of the accommodating space. The heat exchange plate includes: a body portion provided with a heat exchange flow passage; and a fastening portion connected to an entire periphery of the body portion and provided with a plurality of notches, where the notches are recessed inward from an end of the fastening portion, the plurality of notches are spaced apart along the entire periphery of the fastening portion, a protrusion is formed between each two adjacent notches, and the protrusion is fixedly connected to the frame body.

10 Claims, 6 Drawing Sheets

(51) Int. Cl.
*H01M 10/647* (2014.01)
*H01M 50/204* (2021.01)
*H01M 50/209* (2021.01)

(56) References Cited

FOREIGN PATENT DOCUMENTS

| | | |
|---|---|---|
| CN | 207320205 U | 5/2018 |
| CN | 208256867 U | 12/2018 |
| EP | 3675207 A1 | 7/2020 |
| WO | 2018112619 A1 | 6/2018 |

OTHER PUBLICATIONS

The European Patent Office (EPO) The Extended European Search Report for 19903379.6 Dec. 8, 2021 6 Pages.
The European Patent Office (EPO) Communication under Rule 71(3) EPC for 19903379.6 Oct. 16, 2023 5 Pages.
The European Patent Office (EPO) Communication pursuant to Article 94(3) EPC for 19903379.6 Jan. 13, 2023 3 Pages.
The World Intellectual Property Organization (WIPO) International Search Report and Written Opinion for PCT/CN2019/079675 Sep. 26, 2019 14 Pages (including translation).

* cited by examiner

BATTERY PACK

CROSS-REFERENCE TO RELATED APPLICATIONS

This application is a continuation application of PCT Patent Application No. PCT/CN2019/079675, entitled "BATTERY PACK" filed on Mar. 26, 2019, which claims priority to Chinese Patent Application No. 201822246578.1, filed on Dec. 29, 2018 and entitled "BATTERY PACK", both of which are incorporated herein by reference in their entirety.

TECHNICAL FIELD

This application relates to the battery field, and in particular, to a battery pack.

BACKGROUND

As the requirements for energy density and assembly efficiency of battery packs continue to increase, space inside the battery packs is also required to be more and more compact. The integrated design of a box body and a heat exchange plate has become an effective solution to these problems and set a new trend for the development of battery packs. However, in the integrated design, there is no supporting or thermal insulation components between the heat exchange plate and the box body, but direct contact, and the heat exchange plate is made of metal with high thermal conductivity. Therefore, when a heat exchange system heats the battery in a low temperature environment, there will be a large amount of heat transferred to the box body, weakening heat effect of the heat exchange plate on the battery. Similarly, when the heat exchange system cools the battery in a high temperature environment, the heat exchange system also cools the box body, reducing cooling efficiency of the heat exchange system.

SUMMARY

In view of the problems in the Background, this application is intended to provide a battery pack, where the battery pack can reduce the heat transferred from a heat exchange plate to a box body, and improve heat exchange effect of the heat exchange plate on a battery module.

In order to achieve the foregoing objective, this application provides a battery pack, including: a frame body, enclosing an accommodating space that is closed circumferentially and opened in a height direction; and a heat exchange plate, fixed under the frame body and closing a lower opening of the accommodating space. The heat exchange plate includes: a body portion provided with a heat exchange flow passage; and a fastening portion connected to an entire periphery of the body portion and provided with a plurality of notches, where the notches are recessed inward from an end of the fastening portion, the plurality of notches are spaced apart along the entire periphery of the fastening portion, a protrusion is formed between each two adjacent notches, and the protrusion is fixedly connected to the frame body.

In an embodiment, the protrusion is provided with a fastening hole penetrating in a height direction; and the battery pack further includes a first fastener, where the first fastener passes through the fastening hole of the protrusion of the fastening portion to fasten the protrusion to the frame body.

In an embodiment, the protrusion is connected to the frame body by welding or bonding.

In an embodiment, the frame body includes: an outer frame enclosing the accommodating space; and a partition beam provided inside the accommodating space, extending along a transverse direction or a longitudinal direction and fixedly connected to the outer frame, where the partition beam divides the accommodating space into a plurality of sub-spaces. The body portion of the heat exchange plate is provided with a boss corresponding to the partition beam, where the boss is recessed upward from a side of the heat exchange plate away from the partition beam and protruding toward the partition beam, and the boss is fixed to the corresponding partition beam.

In an embodiment, a plurality of bosses are corresponding to the partition beam which are spaced apart and arranged in a line along an extension direction of the partition beam.

In an embodiment, the battery pack further includes a second fastener, where the second fastener passes through the corresponding boss to be fixed to the partition beam.

In an embodiment, the boss is fixed to the partition beam by bonding or welding.

In an embodiment, the heat exchange plate includes: a first plate and a second plate, where the first plate is arranged closer to the frame body than the second plat, and the boss is formed by stamping the first plate and the second plate together.

In an embodiment, the battery pack further includes a plurality of battery modules respectively accommodated in corresponding sub-spaces, where the battery modules are in thermally conductive contact with the body portion of the heat exchange plate.

In an embodiment, the battery modules are fixed to the body portion of the heat exchange plate by a structural adhesive.

The beneficial effects of this application are as follows: In the battery pack according to this application, the provision of a plurality of notches reduces a contact area between the heat exchange plate and the frame body, reducing heat transfer between the heat exchange plate and the frame body, thereby improving heat exchange effect between the heat exchange plate and the battery module.

Figure 1:
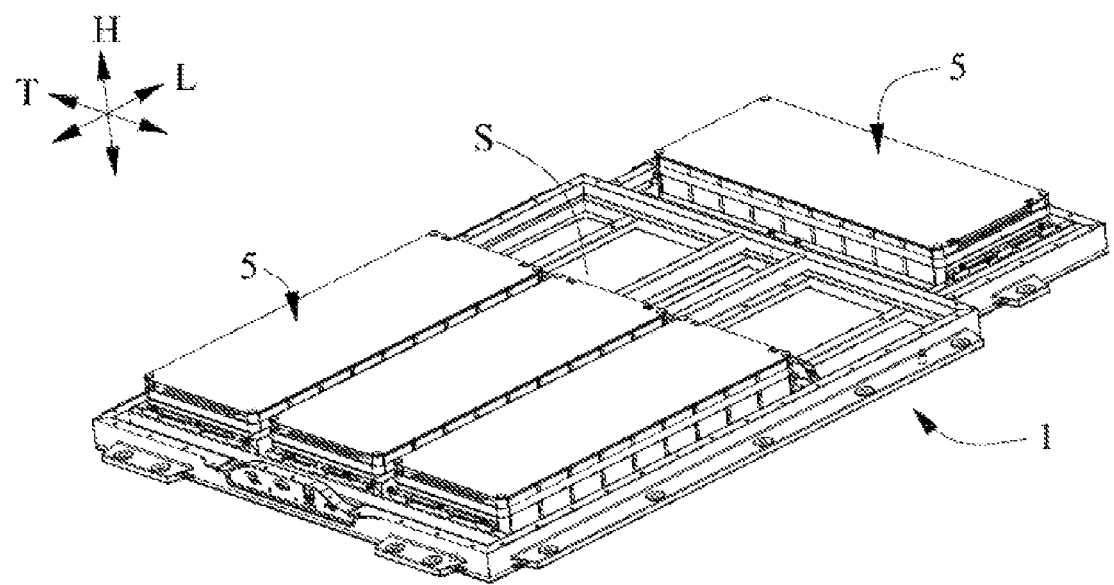
FIG. 1 is an assembly diagram of a battery pack according to this application.
Figure 2:
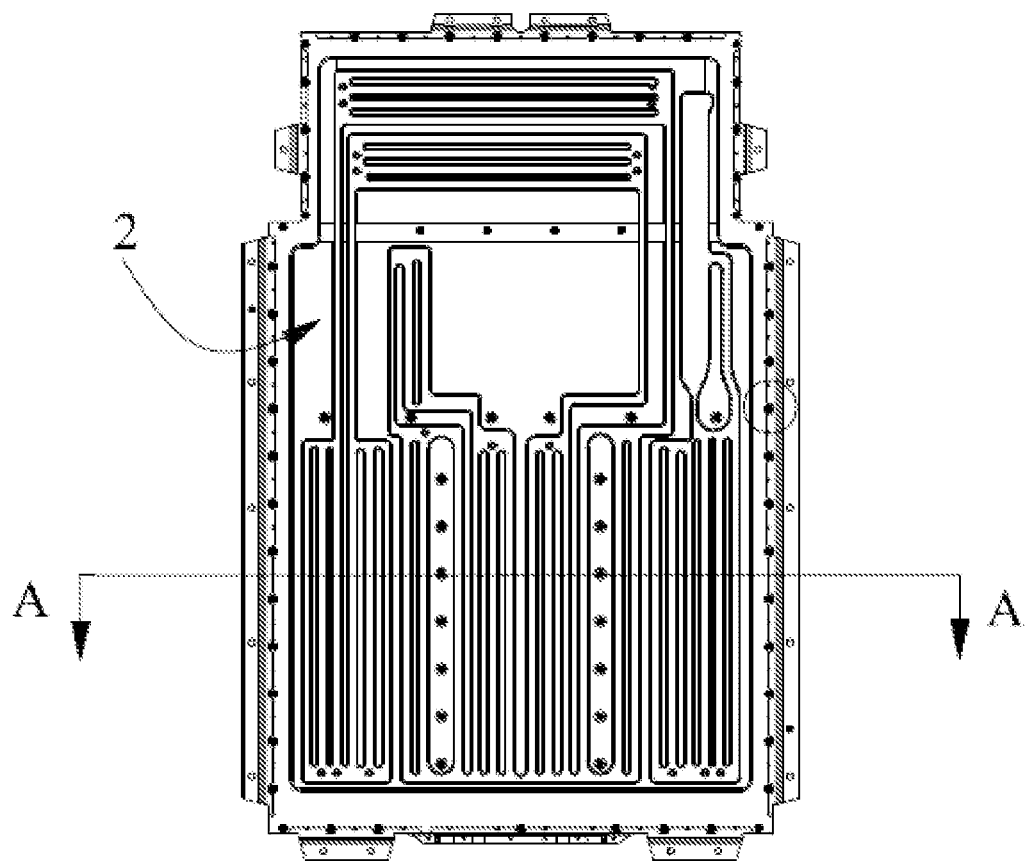
FIG. 2 is a bottom view of FIG. 1.

Reference signs are described as follows:

| | |
|---|---|
| 1. Frame body | 222. Protrusion |
| 11. Outer frame | 222h. Fastening hole |
| 12. Partition beam | 23. First plate |
| S. Accommodating space | 24. Second plate |
| 2. Heat exchange plate | 3. First fastener |
| 21. Body portion | 4. Second fastener |
| 211. Heat exchange flow passage | 5. Battery module |
| | H. Height direction |

-continued

Reference signs are described as follows:

| | |
|---|---|
| 212. Boss | T. Transverse direction |
| 22. Fastening portion | L. Longitudinal direction |
| 221. Notch | |

DESCRIPTION OF EMBODIMENTS

The accompanying drawings show the embodiments of this application. It should be understood that the disclosed embodiments are merely examples of this application and this application can be implemented in various forms. Therefore, specific details disclosed herein should not be construed as a limitation. Instead, they should serve only as a basis for the claims and as an illustrative basis to instruct persons of ordinary skill in the art to implement this application in various ways.

Additionally, expressions such as longitudinal direction, height direction, and transverse direction that are used to indicate directions for the operations and construction of the constituent components in the embodiments are not absolute but rather relative. Such indications are appropriate when these components of battery packs are in the locations illustrated in the drawings; however, these directions should be interpreted differently when these locations change, in order to adapt to the changes.

As shown in FIGS. 1 to 4, a battery pack according to this application includes: a frame body 1, enclosing an accommodating space S that is closed circumferentially and opened in a height direction H: a heat exchange plate 2, fixed under the frame body 1 and closing a lower opening of the accommodating space S; and a plurality of battery modules 5 accommodated in the accommodating space S, where the battery modules 5 are in thermally conductive contact with the heat exchange plate 2. The battery pack may further include a first fastener 3 and a second fastener 4 to fasten the heat exchange plate 2 to the frame body 1. The frame body 1 and the heat exchange plate 2 are sealed and fixed, thereby preventing external foreign objects or liquid from entering the battery pack.

Figure 4:
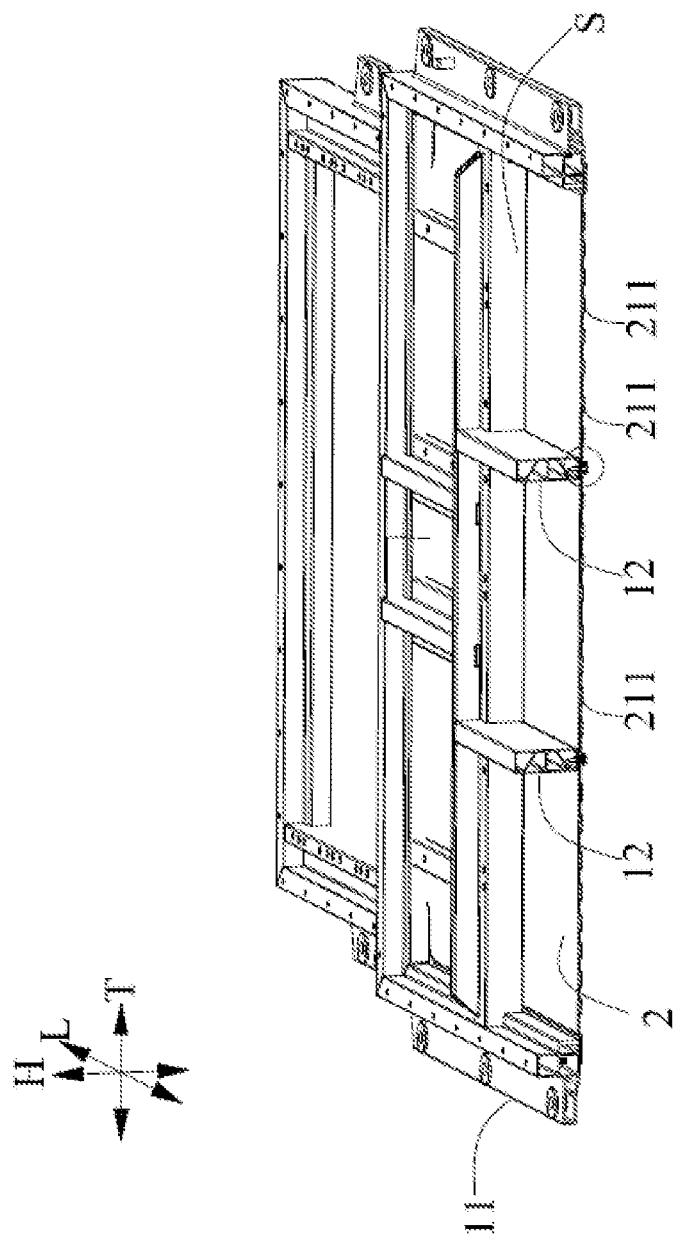
FIG. 4 is a sectional view taken along an A-A line in FIG. 2.

As shown in FIG. 4, the frame body 1 includes: an outer frame 11 enclosing the accommodating space S; and a partition beam 12 provided in the accommodating space S, extending along a transverse direction T or a longitudinal direction L and fixedly connected to the outer frame 11, where the partition beam 12 divides the accommodating space S into a plurality of sub-spaces. The provision of the partition beam 12 improves structural strength of the outer frame 11, avoiding a risk that the frame body 1 is easily damaged when impacted or vibrated, thereby improving impact resistance of the battery pack. The plurality of battery modules 5 are respectively accommodated in the corresponding sub-spaces, and the battery modules 5 are in thermally conductive contact with the body portion 21 of the heat exchange plate 2, with the battery modules 5 fixed to the body portion 21 of the heat exchange plate 2 by a structural adhesive, thereby ensuring heat transfer between the battery modules 5 and the heat exchange plate 2. In addition, the battery modules 5 are fixed to the heat exchange plate 2, avoiding a risk that the battery modules 5 are displaced when the battery pack is impacted or vibrated, thereby improving stability of the battery pack.

Figure 6:
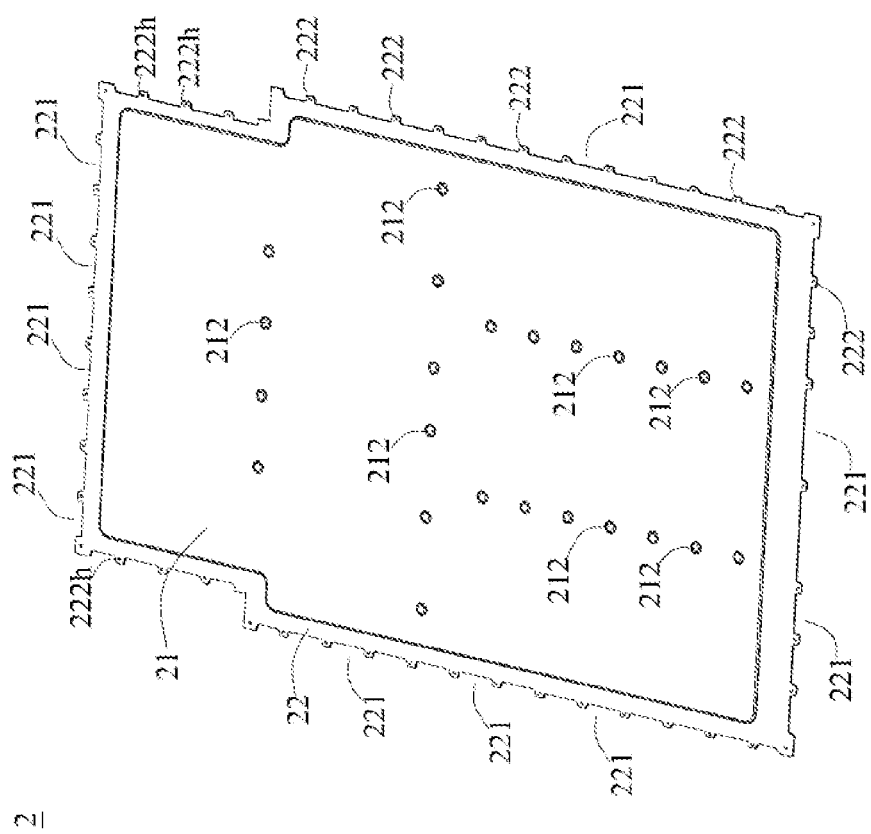
FIG. 6 is a 3-dimensional view of the heat exchange plate in FIG. 2.

As shown in FIG. 6, the heat exchange plate 2 includes a body portion 21 and a fastening portion 22 connected to an entire periphery of the body portion 21. The heat exchange plate 2 includes: a first plate 23 and a second plate 24, where the first plate 23 is arranged closer to the frame body 1 than the second plate 24.

Figure 5:
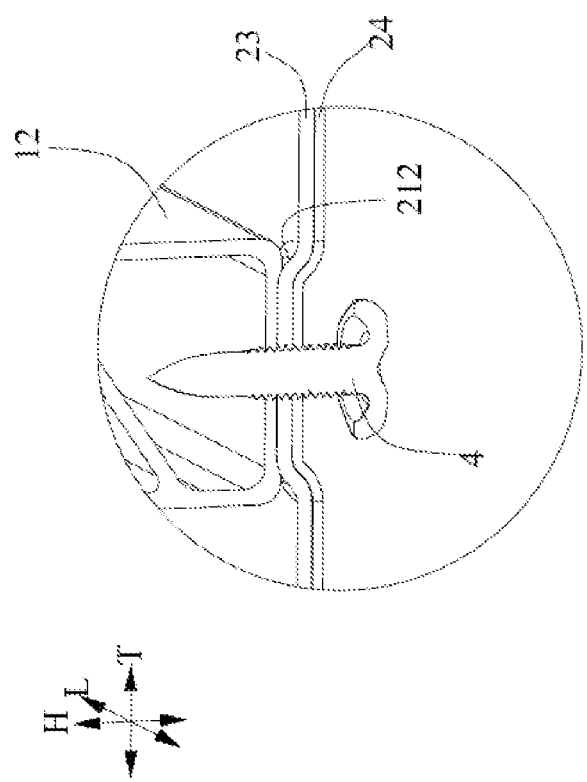
FIG. 5 is a local enlarged view of a circled part in FIG. 4.

As shown in FIGS. 4 to 6, the body portion 21 of the heat exchange plate 2 is provided with a heat exchange flow passage 211. The heat exchange flow passage 211 allows a heat exchange medium to flow therein so as to heat or cool the battery modules 5 fixed to the heat exchange plate 2. The body portion 21 of the heat exchange plate 2 is provided with a boss 212 corresponding to the partition beam 12, where the boss 212 is recessed upward from a side of the heat exchange plate 2 away from the partition beam 12 and protruding toward the partition beam 12, and the boss 212 is fixed to the corresponding partition beam 12. The boss 212 is formed by stamping the first plate 23 and the second plate 24 together. The boss 212 is higher than other areas of the body portion 21 of the heat exchange plate 2 in the height direction H, so that when the boss 212 is fixed to the corresponding partition beam 12, all areas of the body portion 21 of the heat exchange plate 2 except the boss 212 are separated from the frame body 1, thus greatly reducing the contact area between the body portion 21 and the frame body 1, reducing the heat transfer between the heat exchange plate 2 and the frame body 1, avoiding that the frame body 1 takes away a large amount of heat from the heat exchange plate 2, improving the heat exchange effect of the heat exchange plate 2 on the battery module 5, and reducing energy loss of the heat exchange plate 2. In addition, the heat exchange plate 2 is fixed to the partition beam 12 in the body portion 21, preventing the heat exchange plate 2 from being easily deformed due to a large force in a middle area, and the heat exchange plate 2 transmits the force received to the partition beam 12, thereby improving deformation resistance of the heat exchange plate 2. A plurality of bosses 212 are corresponding to the partition beam 12 which are spaced apart and arranged in a line along an extension direction of the partition beam 12. A boss 212 arranged alone provides relatively low strength, so the boss 212 is easily deformed due to concentrated pressure. With a plurality of bosses 212 corresponding to the partition beam 12, the force distributed to each boss 212 is relatively small, and therefore, the bosses 212 are not easily deformed, thus ensuring overall strength of the heat exchange plate 2. The heat exchange plate 2 can be mechanically fixed to the corresponding partition beam 12 at the boss 212. To be specific, the second fastener 4 passes through the corresponding boss 212 to be fixed to the partition beam 12, and the second fastener 4 is a screw. The fixing is certainly not limited to this. The boss 212 of the heat exchange plate 2 can alternatively be fixed to the partition beam 12 by bonding or welding. The specific fixing method can be selected according to the specific situation.

Figure 3:
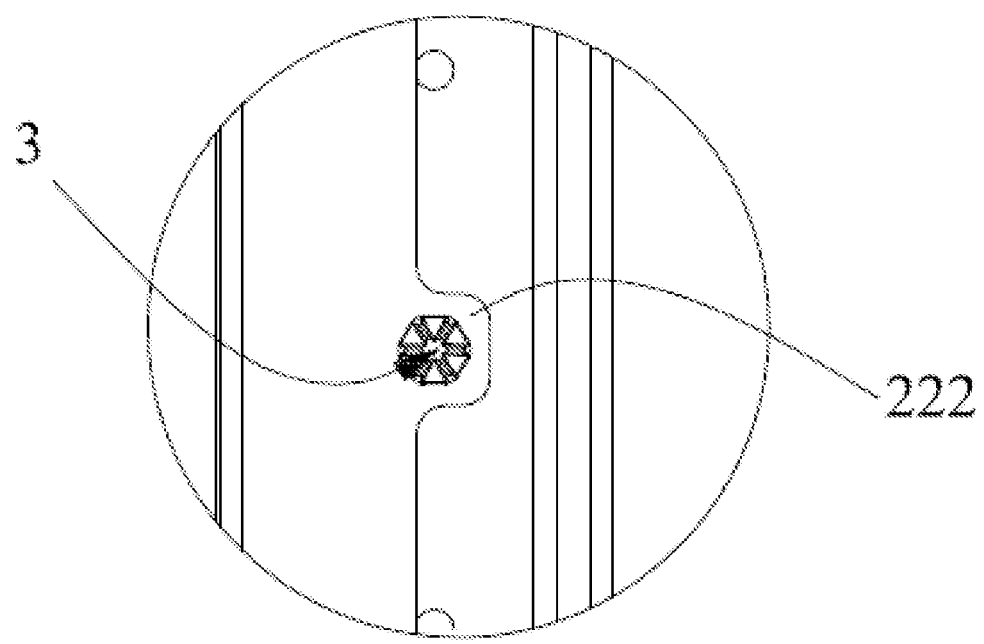
FIG. 3 is a local enlarged view of a circled part in FIG. 2.

As shown in FIG. 6, the fastening portion 22 is provided with a plurality of notches 221, where the notches 221 are recessed inward from an end of the fastening portion 22, the plurality of notches 221 are spaced apart along the entire periphery of the fastening portion 22, a protrusion 222 is formed between each two adjacent notches 221, and the protrusion 222 is fixedly connected to the frame body 1. The provision of a plurality of notches 221 reduces a contact area between the fastening portion 22 of the heat exchange plate 2 and the frame body 1, and reduces heat transfer between the heat exchange plate 2 and the frame body 1, reducing heat taken away by the frame 1 from the heat exchange plate 2, thereby improving the heat exchange effect of the heat exchange plate 2 on the battery module 5. The protrusion 222 is formed between each two adjacent notches 221, and the protrusion 222 is fixedly connected to the frame body 1. The protrusion 222 can be directly connected to the frame body 1 by welding or bonding. The fixing of the protrusion 222 is certainly not limited to this. The protrusion 222 may alternatively be mechanically fixed to the frame body 1. Specifically, as shown in FIG. 3, the protrusion 222 is provided with a fastening hole 222h penetrating along the height direction H, and the first fastener 3 passes through the fastening hole 222h of the protrusion 222 of the fastening portion 22 to fasten the protrusion 222 to the frame body 1, where the first fastener 3 is a screw. The mechanical fixing makes a more reliable connection between the heat exchange plate 2 and the frame body 1.

The foregoing detail descriptions have described a plurality of exemplary embodiments. However, this specification is not intended to limit the application to these expressly disclosed combinations. Therefore, unless otherwise stated, various features disclosed herein may be combined together to form a plurality of other combinations that are not shown for simplicity purposes.

What is claimed is:

1. A battery pack, comprising: a frame body, enclosing an accommodating space that is closed circumferentially and opened in a height direction; and a heat exchange plate, fixed under the frame body and closing a lower opening of the accommodating space, wherein the heat exchange plate comprises: a body portion provided with a heat exchange flow passage; and a fastening portion connected to an entire periphery of the body portion and provided with a plurality of notches, wherein the notches are recessed inward from an end of the fastening portion, the plurality of notches are spaced apart along the entire periphery of the fastening portion, a protrusion is formed between each two adjacent notches, and the protrusions are fixedly connected to the frame body;

the frame body comprises: an outer frame enclosing the accommodating space; and a partition beam provided in the accommodating space; and the body portion of the heat exchange plate is provided with a boss corresponding to the partition beam, wherein a side of the boss away from the partition beam is recessed in a direction toward the partition beam and a side of the boss facing the partition beam protrudes toward the partition beam.

2. The battery pack according to claim 1, wherein each protrusion is provided with a fastening hole penetrating along the height direction; and the battery pack further comprises a first fastener, wherein the first fastener passes through the fastening hole of the protrusions of the fastening portion to fasten the protrusion to the frame body.

3. The battery pack according to claim 1, wherein the protrusions are connected to the frame body by welding or bonding.

4. The battery pack according to claim 1, wherein the partition bean extends along a transverse direction or a longitudinal direction and is fixedly connected to the outer frame, wherein the partition beam divides the accommodating space into a plurality of sub-spaces; and the boss is fixed to the corresponding partition beam.

5. The battery pack according to claim 4, wherein a plurality of bosses are corresponding to the partition beam which are spaced apart and arranged in a line along an extension direction of the partition beam.

6. The battery pack according to claim 4, wherein the battery pack further comprises a second fastener, wherein the second fastener passes through the corresponding boss to be fixed to the partition beam.

7. The battery pack according to claim 4, wherein the boss is fixed to the partition beam by bonding or welding.

8. The battery pack according to claim 4, wherein the heat exchange plate comprises: a first plate and a second plate, wherein the first plate is arranged closer to the frame body than the second plate, and the boss is formed by stamping the first plate and the second plate together.

9. The battery pack according to claim 4, wherein the battery pack further comprises a plurality of battery modules respectively accommodated in corresponding sub-spaces, wherein the battery modules are in thermally conductive contact with the body portion of the heat exchange plate.

10. The battery pack according to claim 9, wherein the battery modules are fixed to the body portion of the heat exchange plate by a structural adhesive.

* * * * *